(12) United States Patent
Grobben et al.

(10) Patent No.: US 12,371,274 B2
(45) Date of Patent: Jul. 29, 2025

(54) SORTING SYSTEM AND METHOD FOR SORTING PRODUCTS

(71) Applicant: Vanderlande Industries B.V., Veghel (NL)

(72) Inventors: Koen Maarten Geert Grobben, Veghel (NL); Thomas Hendrikus Peeters, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 83 days.

(21) Appl. No.: 18/287,500

(22) PCT Filed: May 25, 2022

(86) PCT No.: PCT/NL2022/050286
§ 371 (c)(1),
(2) Date: Oct. 19, 2023

(87) PCT Pub. No.: WO2022/255864
PCT Pub. Date: Dec. 8, 2022

(65) Prior Publication Data
US 2024/0182247 A1    Jun. 6, 2024

(30) Foreign Application Priority Data
May 31, 2021   (NL) ..................................... 2028345

(51) Int. Cl.
*B65G 43/08*     (2006.01)
*B65G 47/84*     (2006.01)

(52) U.S. Cl.
CPC ........... *B65G 43/08* (2013.01); *B65G 47/844* (2013.01); *B65G 2203/0208* (2013.01); *B65G 2203/0266* (2013.01)

(58) Field of Classification Search
CPC .................. B65G 43/08; B65G 47/844; B65G 2203/0208; B65G 2203/0266
(Continued)

(56) References Cited

U.S. PATENT DOCUMENTS

| 3,361,247 A * | 1/1968 | Lauzon ................ B65G 47/844 198/574 |
| 7,725,213 B2 * | 5/2010 | Hysell .................. B65G 47/844 700/229 |

(Continued)

FOREIGN PATENT DOCUMENTS

| JP | 2008214024 A | 9/2008 |
| WO | 2021037610 A1 | 3/2021 |

OTHER PUBLICATIONS

International Search Report and Written Opinion of the International Searching Authority issued in corresponding application PCT/NL2022/050286 mailed Sep. 5, 2022 (13 pages).

*Primary Examiner* — Gene O Crawford
*Assistant Examiner* — Lester Ill Rushin
(74) *Attorney, Agent, or Firm* — Carter, DeLuca & Farrell LLP; Vadim Vapnyar

(57) ABSTRACT

The invention relates to a sorting system for sorting products, comprising a central control server, a conveyor, movable, successive combinations of an elongated carrying body and a pusher body, a supply device for products, each combination further being provided with a pusher body moving device with a driving device for moving the pusher body along the carrying body, wherein the sorting system is provided, per combination or per group of combinations, with a controller, wherein the central control server and the controllers are configured to ensure that in operation, the supply device and the conveyor are controlled in such a way that the carrying body associated with not more and not less than one intermediate combination located between two (Continued)

successive products, is free from the two successive products and so that the pusher body moving device thereof moves the pusher body to a position in which it is located within the widths of the two successive products.

13 Claims, 2 Drawing Sheets

(58) Field of Classification Search
USPC .......................................................... 198/358
See application file for complete search history.

(56) References Cited

U.S. PATENT DOCUMENTS

| | | | |
|---|---|---|---|
| 11,691,181 B2* | 7/2023 | Miyahara | B65G 47/844 |
| | | | 209/653 |
| 2010/0012464 A1 | 1/2010 | Schiesser et al. | |

* cited by examiner

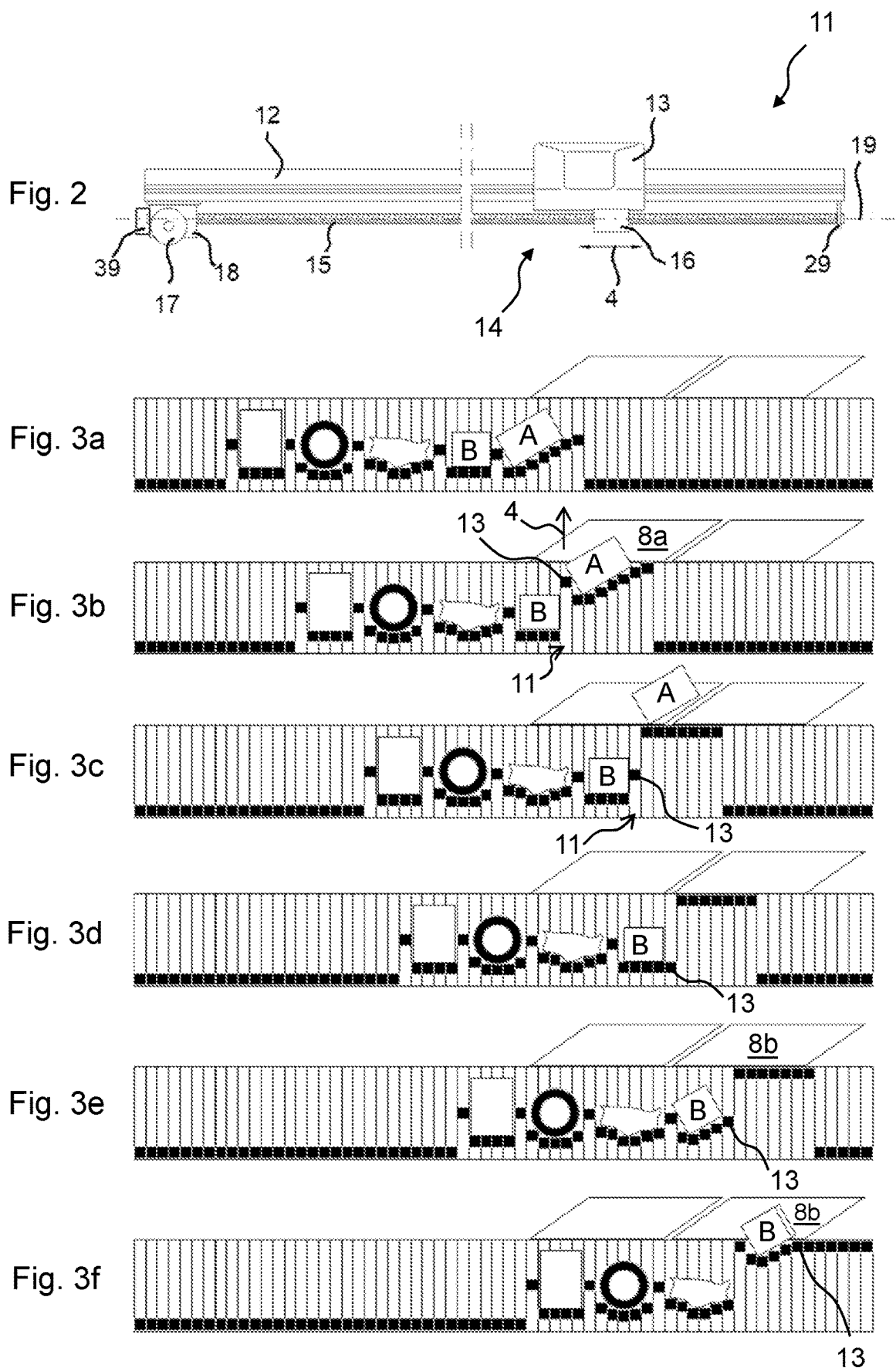

SORTING SYSTEM AND METHOD FOR SORTING PRODUCTS

CROSS-REFERENCE TO RELATED APPLICATIONS

This application is a National Stage Application under 35 U.S.C. § 371 (a) of PCT/NL2022/050286, filed on May 25, 2022, which claims the benefit of and priority to Netherlands Patent Application No. 2028345 filed on May 31, 2021. The entire contents of the foregoing applications are incorporated by reference herein.

SUMMARY

The present invention relates to a sorting system for sorting products. A system of this kind is described in International patent application WO 2021/037610 A1. This system makes use of combinations of an elongated carrying body extending transversely to a direction of transport and individually controllable pusher bodies that are movable along the carrying body. The invention aims to increase the efficiency and reliability with which a sorting system of this kind can be employed and for this purpose provides a sorting system according to claim 1, for sorting products, comprising:
  a central control server,
  a conveyor with a number of successive combinations of an elongated carrying body and a pusher body, movable in a direction of movement following a path along which a number of sorting locations are provided, wherein the carrying bodies extend parallel to each other and perpendicularly to the direction of movement and are arranged for carrying products to be sorted, and
  a supply device controlled by the central control server for supplying successive products to be sorted one after another to the conveyor.

Each combination is further provided with a pusher body moving device, which is provided with a driving device for moving the pusher body in a sorting direction along the carrying body, the sorting direction extending perpendicularly to the direction of movement, for pushing, with the pusher body, against a product carried by the carrying body.

The sorting system is provided, per combination or per group of combinations, with a controller that is operatively connected to said combination or group of combinations and that is configured for receiving destination information coming from the central control server relating to the sorting location where a product to be sorted should be pushed off of the conveyor and for controlling the driving device of the combination or combinations concerned for this purpose.

The central control server and the controllers are configured to ensure that in operation, the supply device and the conveyor are controlled in such a way that the carrying body associated with not more and not less than one intermediate combination located between two successive products, is free from the two successive products and that the pusher body moving device of the intermediate combination moves the pusher body along the carrying body to a position in which the pusher body is located within the widths of the two successive products.

An advantage of the present invention is that through ensuring, in the manner described above, that the carrying body associated with not more and not less than one intermediate combination located between the two successive products is free from the two successive products as well as that the pusher body moving device of the intermediate combination moves the pusher body along the carrying body to a position in which the pusher body is located within the widths of the two successive products, with the system and the method according to the invention, on the one hand a high sorting capacity can be achieved, wherein a large number of products can be sorted per unit of time, which increases the efficiency of the system, while on the other hand it is prevented or at least the chance is reduced that products, including in each case relatively less stable products such as bags, may displace while products are being moved on the conveyor to a sorting location, or at least move by themselves on the conveyor in an undesirable, uncontrolled manner. As a result, the reliability of the system and method according to the invention is also high.

With the feature included in the description and claims, that the pusher body moving device of the intermediate combination moves the pusher body along the carrying body to a position in which the pusher body is located within the widths of the two successive products, it is meant in the context of the present patent application that the pusher body is then located in between the two successive products. With said feature, it is in other words meant that the two successive products, viewed in the sorting direction, extend together over a portion of the carrying bodies that carry the two products, wherein the pusher body of the intermediate combination is located within the same portion. For example, if the two successive products extend together in the sorting direction over a portion of the carrying bodies between a smallest and a largest distance from a first end thereof, such as between 25 and 75 percent of a length of the carrying bodies from a first end thereof, the pusher body of the intermediate combination is thus also located within the same portion. The width of a product is the maximum dimension thereof in the sorting direction.

In an embodiment, the sorting system may comprise a sensing element such as a photocell or, in a more advanced embodiment, a vision system, which is operatively connected at least to the central control server and provides information about the location of products on the supply device, on the basis of which said controlling of the supply device and the conveyor takes place, at least for the purpose of ensuring that in operation, the supply device and the conveyor are controlled in such a way that the carrying body associated with not more and not less than one intermediate combination located between two successive products, is free from the two successive products.

In an embodiment, the sorting system may comprise a said sensing element such as a vision system, which is operatively connected to the central control server as well as to the controllers, wherein for the purpose of ensuring that the pusher body moving device of the intermediate combination moves the pusher body along the carrying body to a position in which the pusher body is located within the widths of the two successive products, the sorting system is configured to determine, making use of the sensing element, said widths of the two successive products, in order to establish, on the basis thereof, said position for the pusher body within the widths of the two successive products, for moving the pusher body to said position. The two successive products determine, with dimensions in the sorting direction thereof, a carrying region in the sorting direction that is located between a smallest distance and a largest distance in the sorting direction from a head end of the carrying bodies, wherein the pusher body of the intermediate combination, if this is moved to a position in which the pusher body is located within the widths of the two successive products, is located in the carrying region.

In an embodiment, the central control server and/or the controllers are configured to control the pusher body moving device in such a way that the pusher body of the intermediate combination moves together with a first of the two successive products in the sorting direction for the first product during the pushing off of said first product from the conveyor at a first sorting location and that the pusher body then moves in an opposite direction, i.e. in a direction opposite to the sorting direction for the first product, and that the pusher body then moves together with the second of the two successive products in the sorting direction for the second product during the pushing off of that second product from the conveyor at a second, downstream sorting location. This provides a more reliable sorting of the second product.

In an embodiment, the central control server is configured for associating, on the basis of at least one property of each product to be sorted, a set of successive combinations with each product to be sorted, for pushing the product concerned off of the conveyor by means of pusher bodies associated with each associated set of combinations at the sorting location in accordance with the destination information, wherein each set of combinations viewed in the direction of transport comprises a front pusher body, a rear pusher body and at least two intermediate pusher bodies, and wherein the rear pusher body associated with the front product of the two successive products and the front pusher body associated with the rear product of the two successive products are the same pusher body, said pusher body belonging to the intermediate combination.

In an embodiment, the central control server and/or controllers are configured to ensure that, during the pushing-off of a product from the conveyor at a sorting location, the rear and front pusher bodies associated with the associated set of combinations move ahead of the respective adjacent intermediate pusher bodies associated with the associated set of combinations. As a result, the product to be sorted is to a large extent guided by the front and rear pusher bodies, which makes the sorting even more reliable.

In an embodiment, the at least one property of a product to be sorted comprises at least one dimension of the product to be sorted, such as preferably a maximum dimension in the direction of movement.

In an embodiment, the at least one property of a product to be sorted comprises at least one orientation with which the product to be sorted is positioned on the conveyor. The positions of the pusher bodies with which the product should be pushed off of the conveyor at a sorting location can thus be coordinated effectively with the orientation of the product.

In an embodiment, the dimension of a pusher body viewed in the direction of movement is greater than the dimension of the associated carrying body. In an embodiment, the elongated carrying body comprises multiple, preferably at most three, mutually parallel elongated carrying body parts that are joined together. In an embodiment, the multiple carrying body parts of a combination are joined together pivotable about respective pivot axes perpendicular to the direction of movement, and thus parallel to the carrying body parts. The pusher body of the combination in that case preferably extends, viewed in the direction of movement, over all of the multiple carrying body parts.

In an embodiment, the sorting system is provided per combination with a controller that is operatively connected to said combination and that is configured for receiving destination information coming from the central control server relating to the sorting location where a product to be sorted should be pushed off of the conveyor and for controlling the driving device of the combination concerned for this purpose. This makes the system modular to a large extent.

In one embodiment, the path is rectilinear.

The invention further relates to a method for using a sorting system according to the present invention, comprising the step of:
making use of the supply device, successively supplying successive products to be sorted to the conveyor, in such a way that the products to be sorted are carried by carrying bodies,
wherein, making use of the central control server and the controllers:
the supply device and the conveyor are controlled in such a way that the carrying body associated with not more and not less than one intermediate combination located between two successive products, is free from the two successive products, and that
the pusher body moving device of the intermediate combination moves the pusher body along the carrying body to a position in which the pusher body is located within the widths of the two successive products.

The method further comprises the step of:
making use of the controllers for the purpose of the combinations that carry the two successive products, based on destination information coming from the central control server relating to the respective sorting locations where the successive products should be pushed off of the conveyor, controlling the driving devices of the combinations concerned in such a way that the products are pushed off of the conveyor at the respective sorting locations.

In one embodiment of the method, for the purpose of the step of moving the pusher body with the pusher body moving device of the intermediate combination along the carrying body to a position in which the pusher body is located within the widths of the two successive products, making use of the aforementioned sensing element, in particular when embodied as the said vision system and preferably also operatively connected to the controllers, also said widths, or in a more advanced embodiment the contours, of the two successive products are determined, after which, based thereon, a said position for the pusher body within the widths of the two successive products is established for the purpose of moving the pusher body to said position.

Preferred embodiments that are described in the context of the system according to the invention are similarly applicable to the method according to the invention, and vice versa. Advantages of the system according to the invention apply in a similar manner to the method according to the invention.

BRIEF DESCRIPTION OF THE DRAWINGS

The present description will be explained in more detail hereunder by means of the description of preferred embodiments of the invention, referring to the following highly schematic figures, in which:

FIG. 2 shows a combination belonging to the system according to FIG. 1, seen in the direction of movement; and FIGS. 3a-3f show, in top view, a part of the system according to FIG. 1, in various successive states regarding the sorting of products.

DETAILED DESCRIPTION

Figure 1:
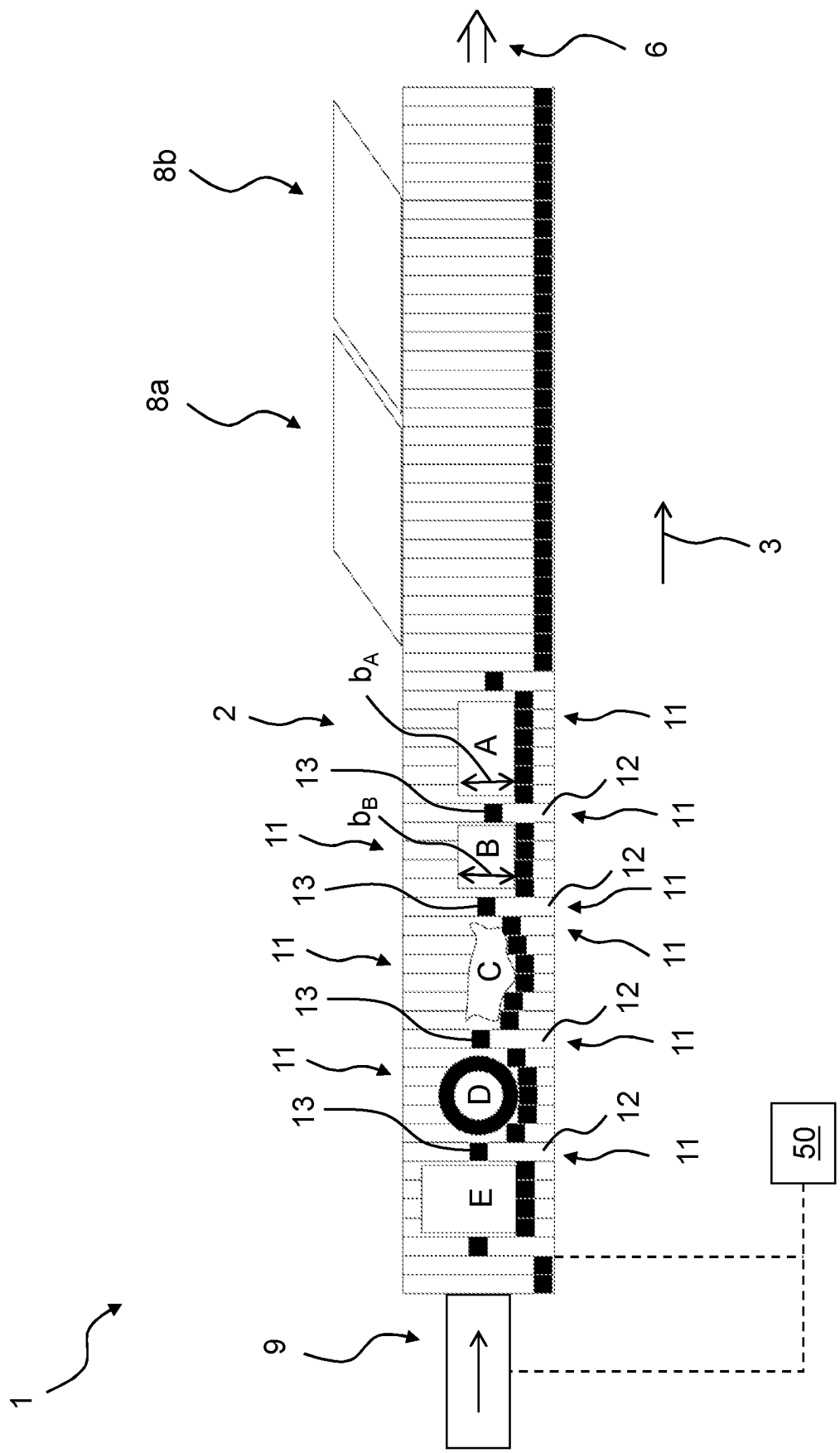
FIG. 1 shows a top view of a preferred embodiment of a sorting system according to the invention.

FIG. 1 shows, highly schematically, a sorting system 1 for sorting products. The figures show, by way of example, five arbitrary products A, B, C, D and E. The system 1 has a conveyor 2 with a number of successive combinations 11 movable in a direction of movement 3 along a path 6, of an elongated carrying body 12, also called a slat, and a pusher body 13, configured as a pusher shoe, wherein the carrying bodies 12 extend parallel to each other and perpendicularly to the direction of movement 3 and are arranged for carrying products to be sorted. A number of sorting locations, in the example according to the figures, two sorting locations 8a, 8b, are provided along the path 9. Although in the figures the sorting locations are located on the same longitudinal side of the conveyor, it is also possible that sorting locations are located on the opposite longitudinal side or that sorting locations are located on both longitudinal sides.

The conveyor 2 is of the endless type and is typically driven by at least one conveyor drive. In the figures, only a limited length of the conveyor is shown (viewed in the direction of movement 3), but in practice the length of the conveyor may be tens or hundreds of metres. The combinations 11 typically move in a loop, wherein an upper part of a loop is shown, in which combinations can carry products. A lower returning part of the loop is not shown, but travels against the direction of movement back from a downstream end of the conveyor to an upstream end of the conveyor. The path 6 may be rectilinear as shown, but may also comprise non-rectilinear parts such as bends. At the upstream and downstream end of the conveyor, the combinations travel along an arched part of the loop. The carrying bodies are each coupled together at their ends by chains, which also travel along the endless loop. The chains are engaged by gears provided at least at the arched parts of the closed loop. At least some of these gears are driven by the aforementioned conveyor drive. The principle of said drive of combinations of carrying bodies and pusher bodies is familiar to a person skilled in the art and consequently does not require any further detailed description here. For illustration, reference is to be made for example to the publications EP 559303 A2 and EP 2346755 A1. Furthermore, reference is made to the publication WO 2009/067110 A2, which describes a variant of a sorting device with combinations of carrying bodies and pusher bodies, wherein chains are not used for connecting carrying bodies together. The present invention is for example also applicable for a sorting device of that kind.

The system 1 has a central control server 50. Moreover, the system 1 has, at an upstream end of the conveyor 2, a supply device 9, controlled by the central control server 50, for successively supplying successive products to be sorted, such as products A to E, to the conveyor 2.

In FIG. 1, only some of the many successive combinations are provided with a reference number. See also FIG. 2, which shows a separate combination 11. Each combination 11 is further provided with a pusher body moving device 14, which is provided with a driving device 17 for moving the pusher body 13 in a sorting direction 4, extending perpendicularly to the direction of movement 3, along the carrying body 12 for pushing the pusher body 13 against a product carried by the carrying body 12. The dimension of the pusher body 13 viewed in the direction of movement is greater than the dimension of the associated carrying body 12. In FIG. 2, it can be seen in this context that the pusher body also extends along the side of the carrying body 12.

The pusher body moving device 14 may, as shown in FIG. 2, be configured as a spindle drive comprising a spindle 15 rotatable about a rotation axis 19, along which a spindle nut 16 can move, which is connected to the pusher body 13. The driving device 17 is in this case an electric motor, which is connected to the spindle 15 by means of a right-angled transmission 18. The spindle is suspended in a bearing 29 at an end located opposite the motor. Other embodiments of the pusher body moving device and driving device are also possible in the context of the invention, for example such as a driving device configured as a servomotor, which drives a pusher body moving device configured as a belt drive, wherein the pusher body is connected to a belt of the belt drive.

The sorting system is provided with a controller 39 for each combination 11, which is operatively connected to said combination 11 and which is configured for receiving destination information coming from the central control server 50 relating to the sorting location 8a, 8b where a product to be sorted should be pushed off of the conveyor 2 and for controlling the driving device of the combination concerned for this purpose. In the present example, the controller 39 is attached to the right-angled transmission 18. However, there is a free choice of the location of the controller on the combination, such as depending on design limitations of the combinations and surrounding components of the conveyor.

The controllers 39 are configured at least for receiving information, for example directly from the central control server 50, relating to the sorting location where a product to be sorted should be pushed off of the associated carrying body and relating to the position of the combination viewed in the direction of movement at least in the sorting path, and for controlling the associated driving device 17. For supply of information relating to the position of the combination viewed in the direction of movement, it is for example possible for a central control server of the sorting system to emit a signal with a certain frequency, which is received by the controllers of all combinations, or at least of all combinations within the sorting path, said signal being representative of the distance travelled by the combinations in the direction of movement since the previous signal. The controller may further be configured with a ROM and/or RAM memory in order to store information relating to the aforementioned sorting location and to determine the longitudinal position of the pusher body relative to the associated carrying body. Determination of said longitudinal position may for example take place on the basis of feedback from the driving device, such as on the basis of an encoder. Data transfer between the central control server and the controller 39 may take place wirelessly, for example by means of a so-called leaky coax system, wherein a leaky coax cable extends along the path or at least a relevant part thereof.

The central control server 50 and the controllers 39 are configured to ensure that in operation, the supply device 9 and the conveyor 2 are controlled in such a way that the carrying body 12 associated with not more and not less than one intermediate combination 11 located between two successive products is free from the two successive products. For this purpose, a sensing element such as a photocell or, in a more advanced embodiment, a vision system may be provided, which is operatively connected at least to the central control server and provides information about the location of products on the supply device, so that said controlling of the supply device 9 and the conveyor 2 is based thereon. See the respective combinations 11, shown in the figures free from a product, each located between two successive products. As an example: between products E and D, only one single combination is located, on which none of the products E and D rests. The central control server 50 and the controllers 39 are further configured to ensure that the pusher body moving device 14 of each intermediate combination 11 moves the pusher body 13 along the carrying body 12 to a position in which the pusher body 13 is located within the widths of the two successive products. Only these respective pusher bodies 13 are given a reference number in FIG. 1. It is shown for example that the pusher body 13 between products B and A is located both within the width bB, i.e. the maximum dimension in the sorting direction 4, of product B, as well as within the width ba of product A.

Making use of the controllers 39 for the purpose of the combinations which carry the two successive products, on the basis of destination information coming from the central control server 50 relating to the respective sorting locations where the successive products should be pushed off of the conveyor, the driving devices of the combinations concerned are controlled, in such a way that the products are pushed off of the conveyor at the respective sorting locations. FIGS. 3a-3c show this method step, wherein pusher bodies of combinations that carry product A, push the product A in such a way that it is pushed off of the conveyor at sorting location 8a. FIGS. 3e and 3f show, in a similar way, the pushing of product B off of the conveyor 2 at sorting location 8b.

The central control server 50 and/or the controllers 39 are then further configured, as an example described on the basis of combination 11 between products A and B, to move the pusher body moving device 14 of the intermediate combination 11 in such a way that the pusher body 13 together with a first one A of the two successive products A, B in the sorting direction 4 for the first product A during pushing of that first product A off of the conveyor 2 at a first sorting location 8a (see FIG. 3b, in which the combination and pusher body concerned are provided with reference numbers and see in addition FIG. 3f for a similar situation regarding product B) and so that the pusher body 13 then moves in an opposite direction (see FIGS. 3c and 3d) and so that the pusher body 13 then moves together with the second B of the two successive products A, B in the sorting direction 4 for the second product B during pushing of that second product B off of the conveyor 2 at a second, downstream sorting location B. Said moving in the opposite direction, as shown in FIGS. 3c and 3d, is at least to a position within the width of the second product B (FIG. 3c) but may alternatively be to a position beyond product B (FIG. 3d). This may be dependent on the geometry of the product B and the way in which the product is pushed towards the sorting location. For example, in the case of sorting at an angle, i.e. with altered orientation of the product, it may be advantageous to move the respective intermediate pusher body beyond the second product, because in that case, as shown in FIG. 3e, it may contribute to the pushing of the second product off of the conveyor. The extent of said movement in the opposite direction is also dependent on the time point that the second product should be sorted. If this is to take place at a sorting location directly downstream, it is conceivable that the pusher body is moved back to a position within the width of the second product B and not to a position beyond product B.

The central control server 50 is further configured, on the basis of at least one property of each product to be sorted, such as at least one dimension of the product to be sorted for example such as a maximum dimension of the product in the direction of movement, for associating a set of successive combinations with each product to be sorted for pushing the product concerned off of the conveyor by means of pusher bodies associated with each associated set of combinations at the sorting location in accordance with the destination information, wherein each set of combinations, viewed in the direction of transport, comprises a front pusher body, a rear pusher body and at least two intermediate pusher bodies, and wherein the rear pusher body associated with the front product of the two successive products and the front pusher body associated with the rear product of the two successive products are the same pusher body, said pusher body belonging to the intermediate combination. In the example discussed of products A and B with the intermediate combination 11 and the pusher body 13 thereof, this pusher body thus relates to the rear pusher body of a set of combinations associated with product A and at the same time the front pusher body of a set of combinations associated with product B. The aforementioned at least one property of a product to be sorted may comprise at least one orientation with which the product to be sorted is positioned on the conveyor, for example an orientation in the sense of a rotational position of the product about a vertical axis, seen in top view.

The central control server and/or the controllers may further be configured to ensure that, during the pushing-off of a product from the conveyor at a sorting location, the rear and front pusher bodies associated with the associated set of combinations move ahead of the respective adjacent intermediate pusher bodies associated with the associated set of combinations. In the example discussed of products A and B with the intermediate combination 11 and the pusher body 13 thereof, this is shown both for products A and B.

The invention claimed is:

1. A sorting system for sorting products, comprising:
a central control server,
a conveyor with a plurality of successive combinations of an elongated carrying body and a pusher body, movable in a direction of movement following a path along which a number of sorting locations are provided, wherein the carrying bodies extend parallel to each other and perpendicularly to the direction of movement and are arranged for carrying products to be sorted,
a supply device controlled by the central control server for supplying successive products to be sorted one after another to the conveyor,
each combination further being provided with a pusher body moving device, which is provided with a driving device for moving the pusher body in a sorting direction along the carrying body, the sorting direction extending perpendicularly to the direction of movement, for pushing, with the pusher body, against a product carried by the carrying body,
wherein the sorting system is provided per combination or per group of combinations with a controller that is operatively connected to said combination or group of combinations and that is configured for receiving destination information coming from the central control server relating to the sorting location where a product to be sorted should be pushed off of the conveyor and for controlling the driving device of the combination or combinations concerned for this purpose,
wherein at least one of the central control server or the controllers are configured to ensure that in operation, the supply device and the conveyor are controlled in such a way that the carrying body associated with not more and not less than one intermediate combination located between two successive products, is free from the two successive products and that the pusher body moving device of the intermediate combination moves the pusher body along the carrying body to a position in which the pusher body is located within a width of each of the two successive products.

2. The sorting system according to claim 1, wherein at least one of the central control server or the controllers are configured for controlling the pusher body moving device in such a way that the pusher body of the intermediate combination moves together with a first of the two successive products in the sorting direction for a first product of the two successive products during the pushing off of said first product from the conveyor at a first sorting location and that the pusher body then moves in an opposite direction and that the pusher body then moves together with a second product of the two successive products in the sorting direction for the second product during the pushing off of that second product from the conveyor at a second, downstream sorting location.

3. The sorting system according to claim 2, wherein the central control server is configured for associating, on the basis of at least one property of each product to be sorted, a set of successive combinations with each product to be sorted, for pushing the product concerned off of the conveyor by means of pusher bodies associated with each associated set of combinations at the sorting location in accordance with the destination information, wherein each set of combinations viewed in the direction of transport comprises a front pusher body, a rear pusher body and at least two intermediate pusher bodies, and wherein the rear pusher body associated with the first product of the two successive products and the front pusher body associated with the second product of the two successive products are the same pusher body, said pusher body belonging to the intermediate combination.

4. The sorting system according to claim 3, wherein at least one of the central control server or the controllers are configured to ensure that, during pushing-off of a product from the conveyor at a sorting location, the rear and front pusher bodies associated with the associated set of combinations move ahead of respective adjacent intermediate pusher bodies associated with the associated set of combinations.

5. The sorting system according to claim 3, wherein the at least one property of a product to be sorted comprises at least one dimension of the product to be sorted.

6. The sorting system according to claim 3, wherein the at least one property of a product to be sorted comprises at least one orientation with which the product to be sorted is positioned on the conveyor.

7. The sorting system according to claim 1, wherein a dimension of a pusher body viewed in the direction of movement is greater than the dimension of the associated carrying body.

8. The sorting system according to claim 1, wherein the sorting system is provided per combination with a controller that is operatively connected to said combination and that is arranged for receiving destination information coming from the central control server relating to the sorting location where a product to be sorted should be pushed off of the conveyor and for controlling the driving device of the combination concerned for this purpose.

9. The sorting system according to claim 1, wherein the sorting system comprises a sensing element such as a vision system, which is operatively connected at least to the central control server and provides information about locations of products on the supply device, such that on the basis thereof said controlling of the supply device and the conveyor takes place for the purpose of ensuring that in operation, the supply device and the conveyor are controlled in such a way that the carrying body associated with not more and not less than one intermediate combination located between two successive products, is free from the two successive products.

10. The sorting system according to claim 1, wherein the sorting system comprises a sensing element such as a vision system that is operatively connected to the central control server and to the controllers, wherein for the purpose of ensuring that the pusher body moving device of the intermediate combination moves the pusher body along the carrying body to a position in which the pusher body is located within the widths of the two successive products, the sorting system is configured to determine, making use of the sensing element, said widths of the two successive products, in order to establish, on the basis thereof, said position for the pusher body within the widths of the two successive products, for moving the pusher body to said position.

11. A method for using a sorting system according to claim 1, comprising the step of:
making use of the supply device, supplying successive products to be sorted one after another to the conveyor, in such a way that the products to be sorted are carried by carrying bodies,
wherein, making use of at least one of the central control server or the controllers such that:
the supply device and the conveyor are controlled in such a way that the carrying body associated with not more and not less than one intermediate combination located between two successive products, is free from the two successive products, and that
the pusher body moving device of the intermediate combination moves the pusher body along the carrying body to a position in which the pusher body is located within the widths of the two successive products,
making use of the controllers for the purpose of the combinations that carry the two successive products, based on destination information coming from the central control server relating to the respective sorting locations where the successive products should be pushed off of the conveyor, controlling the driving devices of the combinations concerned in such a way that the products are pushed off of the conveyor at the respective sorting locations.

12. The method according to claim 11, comprising, for the purpose of pushing one of the products off of the conveyor at the respective sorting locations, making use of the controller that is connected to the intermediate combination that is located directly in front of the product in the direction of movement, moving the pusher body of said intermediate combination against the sorting direction such that the pusher body is located outside the width of that product.

13. The method according to claim 11, wherein, for the purpose of pushing a product off of the conveyor, the method comprises:
at least on the basis of a property of the product to be sorted, associating a set of successive combinations with the product to be sorted, wherein the associated set of combinations, viewed in the direction of transport, comprises a front pusher body, a rear pusher body and at least two intermediate pusher bodies, receiving, by at least one controller, destination information relating to a sorting location where the product to be sorted should be pushed off of the conveyor, controlling, by the at least one controller, the associated set of combinations such that, at the sorting location, pusher bodies associated with the associated set of combinations push the product to be sorted off of the conveyor, wherein during said pushing off, the rear and front pusher bodies, viewed in the sorting direction, move ahead of respective adjacent intermediate pusher bodies.

\* \* \* \* \*